US011921536B2

(12) United States Patent
Voiles et al.

(10) Patent No.: US 11,921,536 B2
(45) Date of Patent: Mar. 5, 2024

(54) SOFT STOP FORCE GRADIENT FOR CONTROL STICK

(71) Applicant: Woodward, Inc., Fort Collins, CO (US)

(72) Inventors: Jeffrey T. Voiles, Niles, IL (US); David Thunga, Chicago, IL (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 17/649,033

(22) Filed: Jan. 26, 2022

(65) Prior Publication Data

US 2023/0236620 A1 Jul. 27, 2023

(51) Int. Cl.
*G05G 9/047* (2006.01)
*G05G 5/05* (2006.01)

(52) U.S. Cl.
CPC ............... *G05G 9/047* (2013.01); *G05G 5/05* (2013.01); *G05G 2009/04766* (2013.01); *G05G 2505/00* (2013.01)

(58) Field of Classification Search
CPC ..... G05G 2009/04766; G05G 2505/00; G05G 5/05; G05G 7/14; G05G 9/047
See application file for complete search history.

(56) References Cited

U.S. PATENT DOCUMENTS 2,939,332 A * 6/1960 Peterson ................ G05G 9/047 74/DIG. 10
3,095,754 A * 7/1963 Mayon ................... G05G 9/047 74/495
3,308,675 A * 3/1967 Jonsson .................... G01S 1/02 74/519
3,744,335 A * 7/1973 Karlsson .............. B62D 11/183 74/471 XY
4,415,782 A * 11/1983 Elmberg ................ G05G 9/047 200/6 A
4,784,008 A * 11/1988 Paquereau ......... G05G 9/04785 74/471 XY (Continued)

FOREIGN PATENT DOCUMENTS

EP 3367205 8/2018

OTHER PUBLICATIONS

International Search Report and Written Opinion in International Appln. No. PCT/US20223/011522, dated Jun. 19, 2023, 14 pages.

*Primary Examiner* — Charles A Fox
*Assistant Examiner* — Gregory T Prather
(74) *Attorney, Agent, or Firm* — Fish & Richardson P.C.

(57) ABSTRACT

The subject matter of this specification can be embodied in, among other things, a control apparatus includes a first mounting member, a pivot member defining an axis, an elongate member configured to pivot about the axis and having a first elongate portion configured as a first lever arm extending away from the pivot member in a first direction, a second elongate portion extending away from the pivot member in a second direction opposite the first direction, a retainer bracket affixed to the second elongate portion, a gimbal moveably affixed to the first mounting member between the pivot member and the retainer bracket, a force bracket moveably affixed to the second elongate portion by the retainer bracket, and a bias member configured to urge movement of the force bracket in the second direction.

20 Claims, 4 Drawing Sheets

(56) References Cited

U.S. PATENT DOCUMENTS

| | | | | |
|---|---|---|---|---|
| 5,150,633 | A * | 9/1992 | Hillgartner | F16H 59/0204 74/473.18 |
| 5,934,145 | A * | 8/1999 | Ersoy | F16H 59/10 74/473.18 |
| 6,189,401 | B1 | 2/2001 | Atwell et al. | |
| 6,227,066 | B1 * | 5/2001 | Stachniak | G05G 9/047 74/471 XY |
| 8,181,914 | B2 | 5/2012 | Kopp | |
| 2001/0002127 | A1 * | 5/2001 | Cheng | G05G 9/047 345/161 |
| 2003/0189547 | A1 * | 10/2003 | Lee | G05G 9/047 345/161 |
| 2004/0221674 | A1 * | 11/2004 | Kornelson | G05G 9/047 74/471 XY |
| 2007/0268251 | A1 * | 11/2007 | Edmunds | G05G 5/05 345/161 |
| 2010/0011897 | A1 * | 1/2010 | Kopp | F16F 1/14 74/471 XY |
| 2018/0095492 | A1 * | 4/2018 | Matloff | G05D 1/0016 |
| 2019/0294197 | A1 * | 9/2019 | Kondo | G06F 3/0338 |

* cited by examiner

SOFT STOP FORCE GRADIENT FOR CONTROL STICK

TECHNICAL FIELD

This instant specification relates to mechanical input controls, and more particularly, aircraft flight controls.

BACKGROUND

Joystick input devices have been employed in a wide range of applications, from aircraft control to video game inputs. Joysticks may be provided to supply directional input information related to a single rotational axis, or to multiple axes. More sophisticated joystick instruments may provide magnitude data as well.

In operation, an operator will manually displace the joystick relative to one or more of its rotational axes in order to issue directional commands to other equipment. Sensors within the joystick will sense the angular displacement of the joystick and develop input signals accordingly, which may be transmitted to the equipment to be controlled. The sensors and the signals they produce may operate electronically, hydraulically, or otherwise.

In many applications it is desirable that the joystick return to a center or neutral position after it has been released by the operator. In some applications it is further desirable that the joystick provide a tactile or haptic indication of position to the operator.

SUMMARY

In general, this document describes mechanical input controls, and more particularly, aircraft flight controls.

In an example embodiment, a control apparatus includes a first mounting member, a pivot member defining an axis, an elongate member configured to pivot about the axis and having a first elongate portion configured as a first lever arm extending away from the pivot member in a first direction, a second elongate portion extending away from the pivot member in a second direction opposite the first direction, a retainer bracket affixed to the second elongate portion, a gimbal moveably affixed to the first mounting member between the pivot member and the retainer bracket, a force bracket moveably affixed to the second elongate portion by the retainer bracket, and a bias member configured to urge movement of the force bracket in the second direction.

Various embodiments can include some, all, or none of the following features. The control apparatus can include a first slot defined in one of the retainer bracket or the force bracket and laterally offset from a primary axis of the second elongate portion in a third direction, a first pin included by the other of the retainer bracket or the force bracket and configured to extend through the first slot and travel along the first slot, such that the force bracket is substantially constrained to pivotal and linear movement relative to the retainer bracket, a second slot defined in one of the retainer bracket or the force bracket and laterally offset from the primary axis of the second elongate portion in a fourth direction opposite the third direction, and a second pin included by the other of the retainer bracket or the force bracket and configured to extend through the second slot and travel along the second slot, such that the force bracket is substantially constrained to pivotal and linear movement relative to the retainer bracket. The first slot can have a first length and the second slot has a second length, and movement of the force bracket by the bias member in the second direction can be constrained based on one or both of the first length and the second length. At least a portion the bias member can be drawn between the force bracket and an attachment point proximal an end of the second elongate portion distal from the pivot member. The elongate member can be configured to pivot about the pivot member through a predetermined angular range, and the force bracket is configured to contact the gimbal at one or more predetermined angles within the predetermined angular range. The force bracket and the retainer bracket can be configured such that contact between the force bracket and the gimbal and angular displacement of the elongate member beyond the one or more predetermined angles urges tension of the bias member. Tension of the bias member can be configured to urge the elongate member toward a center pivotal position with a first predetermined torque.

In an example implementation, a method of actuating a control apparatus, the method including providing a control apparatus having a first mounting member, a pivot member defining an axis, and an elongate member configured to pivot about the axis and including a first elongate portion configured as a first lever arm extending away from the pivot member in a first direction, a second elongate portion extending away from the pivot member in a second direction opposite the first direction, a retainer bracket affixed to the second elongate portion, a gimbal moveably affixed to the first mounting member between the pivot member and the retainer bracket, a force bracket moveably affixed to the second elongate portion by the retainer bracket, and a bias member configured to urge movement of the force bracket in the second direction, applying a first torque to the elongate member in a first direction, pivoting the elongate member about the pivot member in the first direction based on the first torque, contacting, based on the pivoting and at a predetermined angle, the force bracket and the gimbal, and providing, by the bias member and the force bracket based on the contacting, a second torque to the elongate member in a second direction opposite the first direction.

Various implementations can include some, all, or none of the following features. Providing, by the bias member and the force bracket based on the contacting, the second torque to the elongate member in the second direction opposite the first direction can include traversing, by a first pin included by one of the retainer bracket or the force bracket, a portion of a first slot defined in the other of the retainer bracket or the force bracket and laterally offset from a primary axis of the second elongate portion in a third direction, and constraining, by the first pin, the force bracket to pivotal and linear movement relative to the retainer bracket. The first slot can have a first length, and movement of the force bracket by the bias member in the second direction can be constrained based on the first length. The method can include traversing, by a second pin included by one of the retainer bracket or the force bracket, a portion of a second slot defined in the other of the retainer bracket or the force bracket and laterally offset from the primary axis of the second elongate portion in a fourth direction opposite the third direction, and constraining, by the second pin, the force bracket to pivotal and linear movement relative to the retainer bracket. The second slot can have a second length, and movement of the force bracket by the bias member in the second direction can be constrained based on the second length. The second torque can be provided throughout a predetermined range of angles that includes the predetermined angle. Contact between the force bracket and the gimbal and angular displacement of the elongate member beyond one or more predetermined angles can urge tension of the bias member. At least a portion the bias member can be drawn between the force bracket and an attachment point proximal an end of the second elongate portion distal from the pivot member.

In another example embodiment, a self-centering joystick controller providing compound force profiles for restoring said self-centering joystick controller to a center pivotal position after said self-centering joystick controller has been displaced therefrom, the self-centering joystick controller including a first mounting member, a pivot member defining an axis, an elongate member configured to pivot about the axis and having a first elongate portion configured as a first lever arm extending away from the pivot member in a first direction, a second elongate portion extending away from the pivot member in a second direction opposite the first direction, a retainer bracket affixed to the second elongate portion, a gimbal moveably affixed to the first mounting member between the pivot member and the retainer bracket, a force bracket moveably affixed to the second elongate portion by the retainer bracket, and a bias member configured to urge movement of the force bracket in the second direction.

Various embodiments can include some, all or none of the following features. The elongate member can be configured to pivot about the pivot member through a predetermined angular range. The elongate member can pivot with a first force profile between the center pivotal position and one or more predetermined angles within the predetermined angular range. The elongate member can pivot with a second force profile, different from the first force profile, between the one or more predetermined angles and one or more outer limits of the predetermined angular range. The self-centering joystick controller can include a first slot defined in one of the retainer bracket or the force bracket and laterally offset from a primary axis of the second elongate portion in a third direction, a first pin included by the other of the retainer bracket or the force bracket and configured to extend through the first slot and travel along the first slot, such that the force bracket is substantially constrained to pivotal and linear movement relative to the retainer bracket, a second slot defined in one of the retainer bracket or the force bracket and laterally offset from the primary axis of the second elongate portion in a fourth direction opposite the third direction, and a second pin included by the other of the retainer bracket or the force bracket and configured to extend through the second slot and travel along the second slot, such that the force bracket is substantially constrained to pivotal and linear movement relative to the retainer bracket.

The systems and techniques described here may provide one or more of the following advantages. First, a system can provide user controls with force feedback. Second, the system can provide multiple different levels of feedback force. Third, the system can be configured to provide the multiple levels of feedback at predetermined angles. Fourth, the system can provide the force feedback with passive mechanical components.

The details of one or more implementations are set forth in the accompanying drawings and the description below. Other features and advantages will be apparent from the description and drawings, and from the claims.

DETAILED DESCRIPTION

This document describes mechanical devices for accepting operator input, such as flight control sticks or side sticks used by aircraft pilots. In general, an aircraft or other machine may provide a "joystick" type user control, and an operator may manipulate the stick to control the machine. For example, the operator may push, pull, move side to side, or otherwise manipulate a control stick to steer the machine.

In general, some implementations may benefit from a control stick configuration that provides tactile or haptic feedback to the operator or pilot. For example, a control stick that can provide different levels of resistance in a non-linear manner in order to passively inform the operator that the stick has been displaced beyond a predetermined range of motion. In some examples, the angular ranges of haptic feedback can be configured to correspond to output position (e.g., to warn of a nearby end of travel), output setting (e.g., power output beyond a rated amount), or to indicate any other appropriate operational information to the operator.

In general, some implementations may benefit from a control stick that provides differing, possibly non-linearly changing, centering forces that are position-dependent. For example, a control may be configured to provide additional amounts of centering force to help urge the control stick (e.g., and the connected output) away from an extreme end of travel or output (e.g., a potential stall position, a temporarily over-drivable output) to a position or output level that can be maintained for longer periods of time (e.g., cruising positions, nominal output levels).

Weight, cost, and size, are other considerations that may generally influence the selection of a control stick mechanism, especially for use in aircraft applications. Issues of weight, cost, and/or size considerations, however, may run counter to the inclusion of self-centering features which can add complexity to a control stick design, and still may not provide the aforementioned operator feedback.

Figure 1:
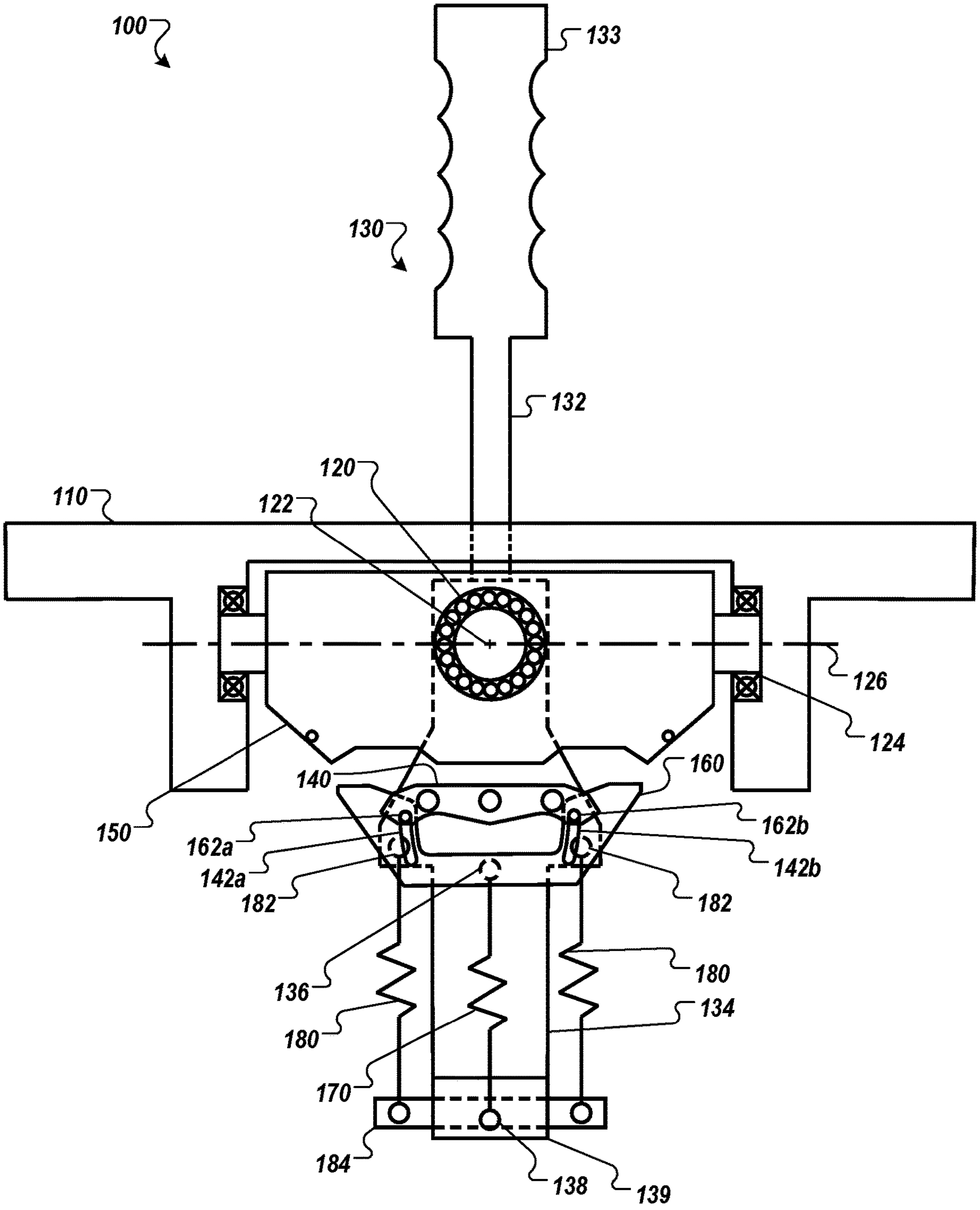
FIG. 1 is a plan view of an example control apparatus in a first configuration.

FIG. 1 is a plan view of an example control apparatus 100 in a first configuration. In the illustrated example, the control apparatus 100 is shown as a self-centering joystick controller with the control stick in a center pivotal position.

The example control apparatus 100 includes a mounting member 110. In some embodiments, the mounting member 110 can be a component of the control apparatus 100, such as a mounting plate that can be affixed to a location proximal to an operator's location (e.g., affixed to an airframe within the cockpit of an aircraft). In some embodiments, the mounting member 110 can be a component of a structure external to the control apparatus 100 (e.g., the mounting member 110 can be a portion of a control panel or airframe to which the rest of the control apparatus is affixed).

The example control apparatus 100 also includes a pivot member 120 defining an axis 122, and a pivot member 124 defining an axis 126 that is substantially perpendicular to the axis 122. An elongate member 130 is configured to pivot about the axis 122 in a first direction (e.g., an X direction, forward and backward), and pivot about the axis 126 in a second, substantially perpendicular direction (e.g., a Y direction, side to side).

The elongate member 130 includes an elongate portion 132 configured as a first lever arm extending away from the pivot member 120 in a first direction. In some embodiments, the elongate member 130 can include or extend to a joystick hand control extending upward or outward for manipulation by an operator or pilot. An elongate portion 134 extends away from the pivot member 120 in a second direction opposite the first direction (e.g., downward or inward, recessed away from the operator or pilot).

A retainer bracket 140 is affixed to the elongate portion 134, and a gimbal 150 is moveably affixed to the mounting member 110 between the pivot member 120 and the retainer bracket 140 and configured to pivot about the axis 126. A force bracket 160 is moveably affixed to the elongate portion 134 by the retainer bracket 140.

A bias member 170 (e.g., a spring) of the example control apparatus 100 is drawn between an attachment point 136 on the force bracket 160 and an attachment point 138 proximal an end 139 of the elongate portion 134 distal from the pivot member 120. The purpose of the bias member 170 will be discussed in more detail in the descriptions of FIGS. 2 and 3.

A collection of bias members 180 (e.g., springs) are drawn between mounting points 182 affixed to the elongate portion 134 and a moveable plate 184 proximal the end 139. The moveable plate 184 is configured to extend along the length of the elongate portion 134 as the elongate member 130 pivots about the pivot member 120 away from the illustrated center position, and retract as the elongate member 130 returns to center. As the elongate member 130 is moved away from center, the moveable plate 184 extends, tensioning the bias members 180. Tension on the bias members 180 urges retraction of the moveable plate, which in turn creates a return force that urges the elongate member 130 toward the center position. In some embodiments, the return force provided by the bias members 180 can provide a substantially linear or proportional return force profile that can be felt by the operator.

A slot 142*a* is defined in the force bracket 160. The slot 142*a* is laterally offset from a primary axis of the elongate portion 134. A slot 142*b* is defined in the force bracket 160. The slot 142*b* is laterally offset from a primary axis of the elongate portion 134 opposite the slot 142*a*. A pin 162*a* extends from the retainer bracket 140 through the slot 142*a* and is configured to permit travel of the slot 142*a* such that the force bracket 160 is substantially constrained to pivotal and linear movement relative to the retainer bracket 140. A pin 162*b* extends from the retainer bracket 140 through the slot 142*b* and is configured to permit travel of the slot 142*b* such that the force bracket 160 is substantially constrained to pivotal and linear movement relative to the retainer bracket 140. The pins 162*a*-162*b* and the slots 142*a*-142*b* moveably affix the retainer bracket 140 to the force bracket 160.

The bias member 170 is configured to urge movement of the force bracket 160 away from the pivot member 120 and toward the end 139. Tension provided by the bias member 170 draws the force bracket 160 away from the pivot member 120 until the pins 162*a* and 162*b* hit their respective ends of travel within the slots 142*a* and 142*b*. The slot 142*a* has a first length and the slot 142*b* has a second length, and movement of the force bracket 160 by tension of the bias member 170 away from the pivot member 120 is constrained based on one or both of the first length and the second length. The functions of the bias member 170, the retainer bracket 140, and the force bracket 160 are discussed further in the descriptions of FIGS. 2 and 3.

Figure 2:
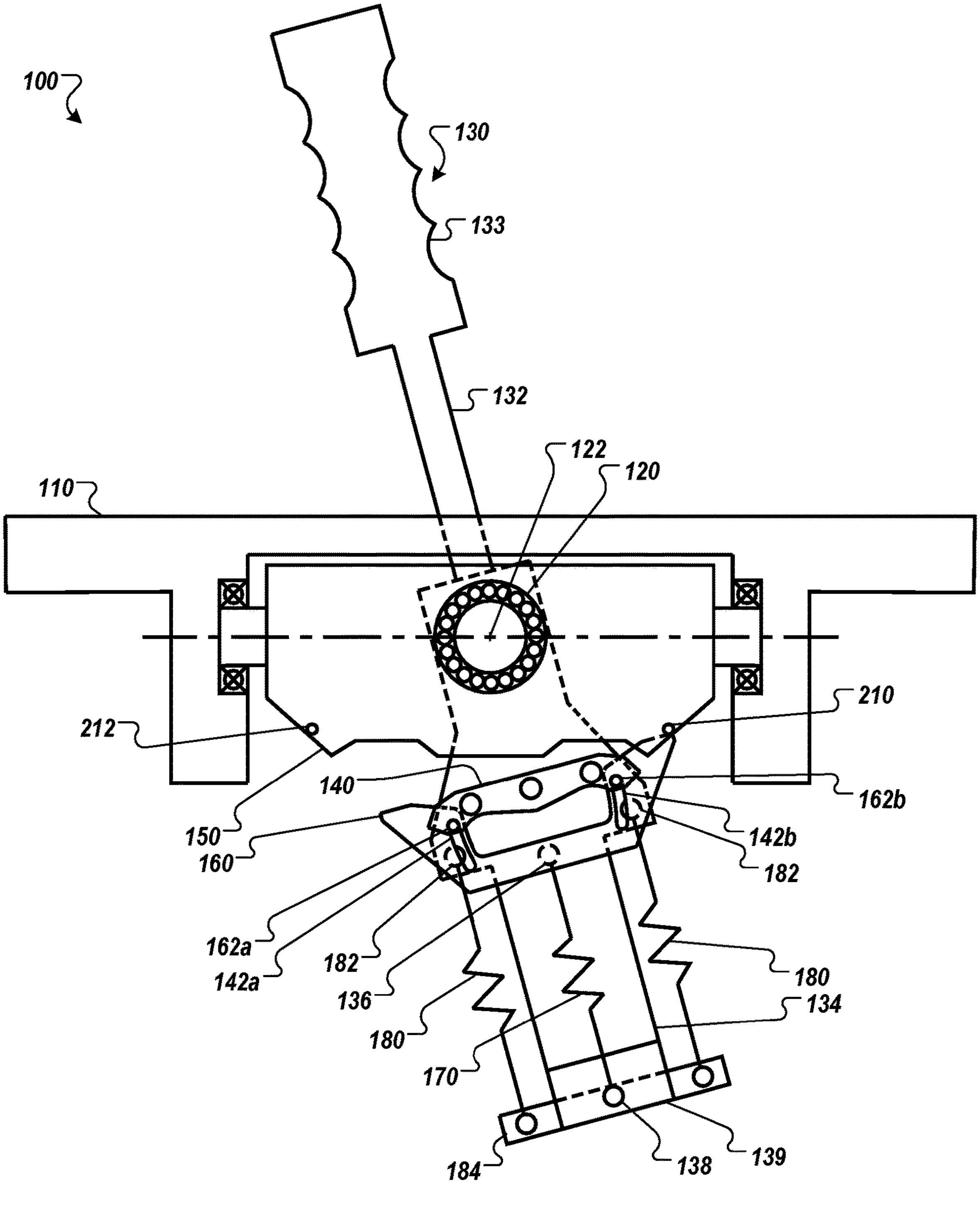
FIG. 2 is a plan view of the example control apparatus of FIG. 1 in a second configuration.

FIG. 2 is a plan view of the example control apparatus 100 of FIG. 1 in a second configuration. In the illustrated view, the elongate member 130 has been partly rotated about the axis 122 (e.g., about 15°).

Figure 3:
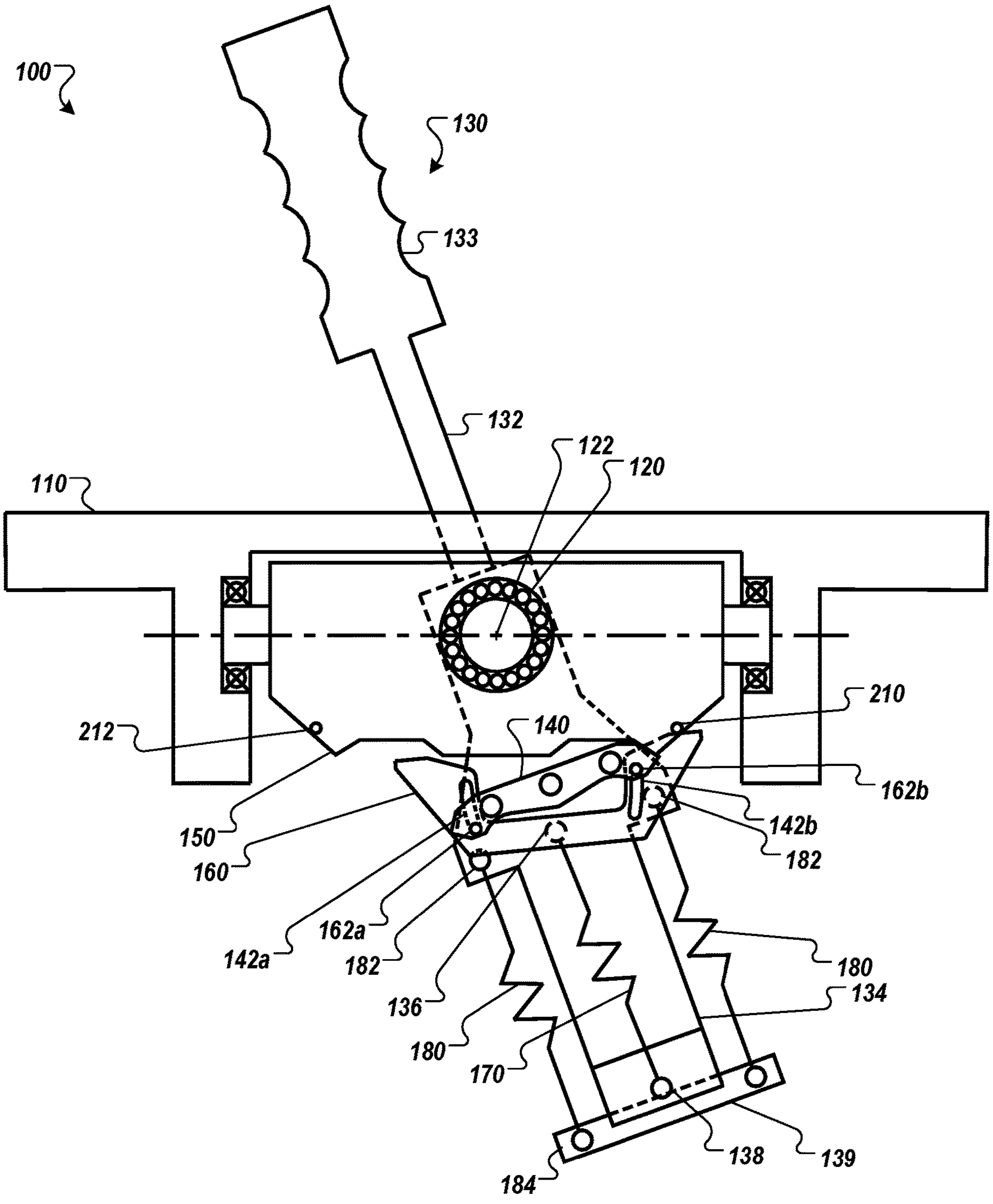
FIG. 3 is a plan view of the example control apparatus of FIG. 1 in a third configuration.

The elongate member 130 is configured to pivot about the pivot member 120 through a predetermined angular range before hitting a hard stop end of travel. The force bracket 160 is configured to contact the gimbal 150 at a contact point 210 when the elongate member 130 is at one or more predetermined angles away from center within the predetermined angular range (e.g., about 10-15° away from center in either direction), as shown in FIG. 3 and will be discussed further in the description of FIG. 3. In the illustrated example of FIGS. 1 and 2, the elongate member 130 has not been pivoted far enough to bring the force bracket 160 into contact with the gimbal 150 at the contact point 210.

FIG. 3 is a plan view of the example control apparatus 100 of FIG. 1 in a third configuration. In the illustrated view, the elongate member 130 has been partly rotated about the axis 122.

The elongate member 130 is configured to pivot about the pivot member 120 through a predetermined angular range (e.g., in the illustrated example, about 20° away from center in either direction before hitting a hard stop end of travel). The force bracket 160 is configured to contact the gimbal 150 at a contact point 210 when the elongate member 130 is at one or more predetermined angles away from center within the predetermined angular range (e.g., about 10-15° away from center in either direction in the illustrated example). A corresponding contact point 212 is contacted when the elongate member 130 is sufficiently pivoted in the opposite direction away from center. In some embodiments, the predetermined angular range can be any appropriate symmetrical or asymmetrical range of motion of the elongate member 130. In some embodiments, the one or more predetermined angles can be any appropriate angle within the range of motion of the elongate member 130.

When the elongate member 130 is pivoted within the predetermined angles, the force bracket 160 does not contact the gimbal 150 at either of the contact points 210 or 212. Within this range of motion, the force bracket 160 remains fully retracted, with the pins 162*a* and 162*b* constrained at the hard stop ends of the slots 142*a* and 142*b* that are most proximal to the pivot member 120 (e.g., the force bracket 160 "hangs" from both of the pins 162*a*, 162*b*). Within this range of motion, a centering force is provided by the collection of bias members 180, with substantially no additional force contribution by the bias member 170. Within this range of motion, the force bracket 160 moves with the elongate portion 134, and the angle of the force bracket 160 relative to the gimbal 150 changes in a substantially 1:1 ratio with the angular displacement of the elongate member 130.

When the elongate member 130 is pivoted within the predetermined angles, as shown in the illustrated example, the force bracket 160 contacts the gimbal 150 at a contact point 210. The force bracket 160 and the retainer bracket 140 are configured such that contact between the force bracket 160 and the gimbal 150, and angular displacement of the elongate member 130 beyond the one or more predetermined angles, urges tension of the bias member 170.

Contact at the contact point 210 defines a fulcrum about which force bracket 160 can pivot relative to the gimbal 150. Within this extended range of motion, the force bracket 160 still moves with the elongate portion 134, but angular movement of the force bracket 160 relative to the gimbal 150 becomes constrained by the contact, and angular movement of the force bracket 160 no longer changes in a substantially 1:1 ratio relative to the angular displacement of the elongate member 130.

The constrained motion of the force bracket 160 relative to the rest of the components carried by the elongate portion 134, such as the attachment point 138, causes the attachment point 136 to move away from the attachment point 138, which increases tension of the bias member 170, urging movement of the elongate member 130 back toward the centered position. The tension of the bias member 170 is transmitted back through the force bracket 160, and urges movement of the force bracket 160 away from the contact point 210 and the gimbal 150. As such, the tension of the bias member provides an additional return force (e.g., in addition to the return force already provided by the collection of bias member 180) that urges the elongate member 130 toward the center position. Similar interactions can occur when the elongate member 130 is moved in the direction opposite of that shown in the illustrated example such that the force bracket 160 contacts the gimbal 150 at the contact point 212. In some embodiments, the return force provided by the interactions of the retainer bracket 140, the gimbal 150, the force bracket 160, and the bias member 170 can provide a predetermined torque as a substantially non-linear or non-proportional return force profile that can be felt by the operator as the elongate member 130 is pivoted between its centered, null position and beyond the predetermined angles (corresponding to contact at the contact point 210 and/or 212) within the outer limits of its range of motion.

Figure 4:
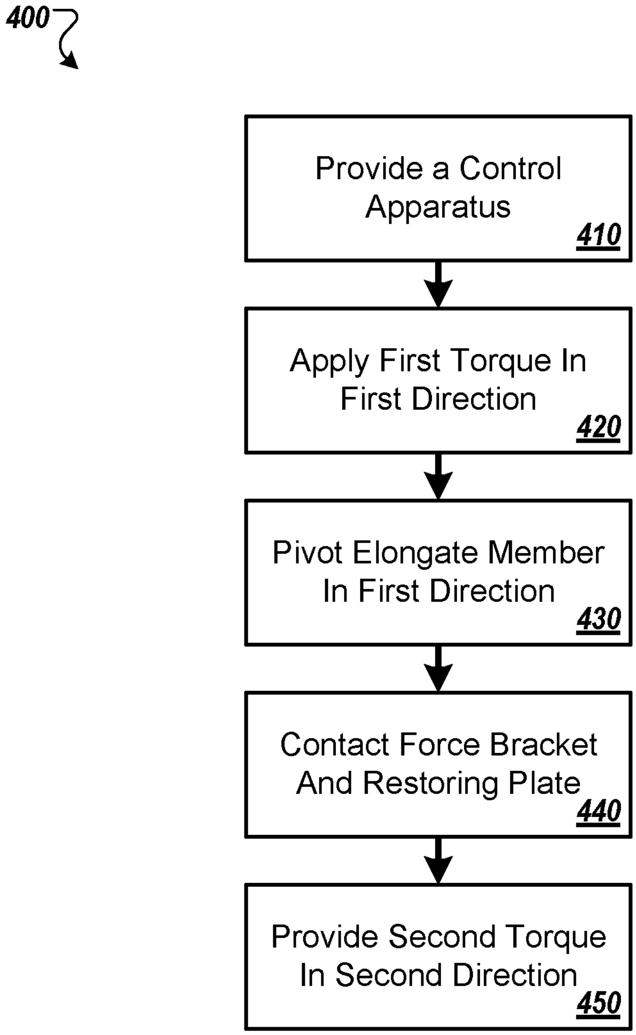
FIG. 4 is a flow chart that shows an example of a process for actuating a control apparatus.

FIG. 4 is a flow chart that shows an example of a process 400 for actuating a control apparatus. For example, the process 400 could be used with the example control apparatus of FIGS. 1-3.

At 410, a control apparatus is provided. The control apparatus includes a first mounting member, a pivot member defining an axis, and an elongate member configured to pivot about the axis. The elongate member includes a first elongate portion configured as a first lever arm extending away from the pivot member in a first direction, a second elongate portion extending away from the pivot member in a second direction opposite the first direction, a retainer bracket affixed to the second elongate portion, a gimbal moveably affixed to the first mounting member between the pivot member and the retainer bracket, a force bracket moveably affixed to the second elongate portion by the retainer bracket, and a bias member configured to urge movement of the force bracket in the second direction. For example, the example control apparatus 100 can be provided.

At 420, a first torque is applied to the elongate member in a first direction. For example, the example elongate portion 132 can be pushed from the centered position shown in FIG. 1 toward the right as shown in FIGS. 2 and 3.

At 430, the elongate member is pivoted about the pivot member in the first direction based on the first torque. For example, as shown in FIGS. 2 and 3, the example elongate member 130 is rotated partly clockwise relative to its position in FIG. 1.

At 440, the force bracket and the gimbal are contacted based on the pivoting and at a predetermined angle. For example, the example force bracket 160 can contact the example gimbal 150 at the example contact point 210, as shown in FIG. 3.

At 450, the bias member and the force bracket provide a second torque to the elongate member in a second direction opposite the first direction based on the contacting. For example, as shown in FIG. 3, the contact at the contact point 210 causes the example bias member 170 to become tensioned, which creates a torque that resists the input forces and urges movement of the elongate member 130 back toward center.

In some implementations, providing, by the bias member and the force bracket based on the contacting, the second torque to the elongate member in the second direction opposite the first direction can include traversing, by a first pin included by one of the retainer bracket or the force bracket, a portion of a first slot defined in the other of the retainer bracket or the force bracket and laterally offset from a primary axis of the second elongate portion in a third direction, and constraining, by the first pin, the force bracket to pivotal and linear movement relative to the retainer bracket. For example, when the force bracket 160 contacts the example gimbal 150 at the contact point 210, the force bracket 160 moves relative to the retainer bracket 140, causing the pin **162*a* to travel along the slot 142*a*. In some implementations, the first slot can have a first length, and movement of the force bracket by the bias member in the second direction can be constrained based on the first length. For example, the pin 162*a* can travel along the slot 142*a* until the pin 162*a* encounters either end of the slot 142*a***.

In some implementations, the process 400 can also include traversing, by a second pin included by one of the retainer bracket or the force bracket, a portion of a second slot defined in the other of the retainer bracket or the force bracket and laterally offset from the primary axis of the second elongate portion in a fourth direction opposite the third direction, constraining, by the second pin, the force bracket to pivotal and linear movement relative to the retainer bracket. For example, when the force bracket 160 contacts the example gimbal 150 at the contact point 212, the force bracket 160 moves relative to the retainer bracket 140, causing the pin **162*b* to travel along the slot 142*b*. In some implementations, the second slot can have a second length, and movement of the force bracket by the bias member in the second direction can be constrained based on the second length. For example, the pin 162*b* can travel along the slot 142*b* until the pin 162*b* encounters either end of the slot 142*b***.

In some implementations, the second torque can be provided throughout a predetermined range of angles that includes the predetermined angle. For example, the restoring torque provided by the bias member 170 can be provided in a range of angles between the angle where the force bracket 160 first contacts the gimbal 150 and the outer limits of the elongate member's 130 range of motion.

In some implementations, contact between the force bracket and the gimbal and angular displacement of the elongate member beyond one or more predetermined angles can urge tension of the bias member. In some implementations, at least a portion of the bias member can be drawn between the force bracket and an attachment point proximal an end of the second elongate portion distal from the pivot member. For example, contact between the force bracket 160 and the gimbal 150 can cause movement of the force bracket 160 away from the attachment point 138, causing tension in the bias member 170.

Although a few implementations have been described in detail above, other modifications are possible. For example, while the example control apparatus 100 has been illustrated and described as a joystick type controller, the assemblies and techniques described in this document can be adapted to other types of controls, such as foot controls (e.g., pedals). In another example, a rotary control (e.g., steering wheels, dials, knobs) can be configured to urge movement of the elongate portion 134 about the pivot point 120. In another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A control apparatus comprising:

a first mounting member;

a pivot member defining an axis;

an elongate member configured to pivot about the axis and comprising:

a first elongate portion configured as a first lever arm extending away from the pivot member in a first direction;

a second elongate portion extending away from the pivot member in a second direction opposite the first direction;

a retainer bracket affixed to the second elongate portion and configured to pivot relative to the first mounting member about the axis based on pivotal movement of the second elongate portion;

a gimbal moveably affixed to the first mounting member between the pivot member and the retainer bracket;

a force bracket moveably affixed to the second elongate portion by the retainer bracket and configured to pivot about the axis based on pivotal movement of the second elongate portion and pivot relative to the retainer bracket; and a bias member configured to urge movement of the force bracket in the second direction.

2. The control apparatus of claim 1, further comprising:

a first slot defined in one of the retainer bracket or the force bracket and laterally offset from a primary axis of the second elongate portion in a third direction;

a first pin comprised by the other of the retainer bracket or the force bracket and configured to extend through the first slot and travel along the first slot, such that the force bracket is substantially constrained to pivotal and linear movement relative to the retainer bracket;

a second slot defined in one of the retainer bracket or the force bracket and laterally offset from the primary axis of the second elongate portion in a fourth direction opposite the third direction; and a second pin comprised by the other of the retainer bracket or the force bracket and configured to extend through the second slot and travel along the second slot, such that the force bracket is substantially constrained to pivotal and linear movement relative to the retainer bracket.

3. The control apparatus of claim 2, wherein the first slot has a first length and the second slot has a second length, and movement of the force bracket by the bias member in the second direction is constrained based on one or both of the first length and the second length.

4. The control apparatus of claim 1, wherein at least a portion of the bias member is drawn between the force bracket and an attachment point proximal to an end of the second elongate portion distal from the pivot member.

5. The control apparatus of claim 1, wherein the elongate member is configured to pivot about the pivot member through a predetermined angular range, and the force bracket is configured to contact the gimbal at one or more predetermined angles within the predetermined angular range.

6. The control apparatus of claim 5, wherein the force bracket and the retainer bracket are configured such that contact between the force bracket and the gimbal and angular displacement of the elongate member beyond the one or more predetermined angles urges tension of the bias member.

7. The control apparatus of claim 5, wherein tension of the bias member is configured to urge the elongate member toward a center pivotal position with a first predetermined torque.

8. A method of actuating a control apparatus, the method comprising:

providing a control apparatus comprising:

a first mounting member;

a pivot member defining an axis; and an elongate member configured to pivot about the axis and comprising:

a first elongate portion configured as a first lever arm extending away from the pivot member in a first direction;

a second elongate portion extending away from the pivot member in a second direction opposite the first direction;

a retainer bracket affixed to the second elongate portion;

a gimbal moveably affixed to the first mounting member between the pivot member and the retainer bracket;

a force bracket moveably affixed to the second elongate portion by the retainer bracket; and a bias member configured to urge movement of the force bracket in the second direction;

applying a first torque to the elongate member in the first direction;

pivoting the elongate member about the pivot member in the first direction based on the first torque;

contacting, based on the pivoting and at a predetermined angle, the force bracket to the gimbal; and providing, by the bias member and the force bracket based on the contacting, a second torque to the elongate member in the second direction opposite the first direction.

9. The method of claim 8, wherein providing, by the bias member and the force bracket based on the contacting, the second torque to the elongate member in the second direction opposite the first direction further comprises:

pivoting the force bracket relative to the gimbal about a fulcrum defined by the contacting;

traversing, by a first pin comprised by one of the retainer bracket or the force bracket, a portion of a first slot defined in the other of the retainer bracket or the force bracket and laterally offset from a primary axis of the second elongate portion in a third direction; and constraining, by the first pin, the force bracket to pivotal and linear movement relative to the retainer bracket.

10. The method of claim 9, wherein the first slot has a first length, and movement of the force bracket by the bias member in the second direction is constrained based on the first length.

11. The method of claim 9, further comprising:

applying a third torque to the elongate member in the second direction;

pivoting the elongate member about the pivot member in the second direction based on the third torque;

contacting, based on the pivoting and at a second predetermined angle, the force bracket to the gimbal;

pivoting the force bracket relative to the gimbal about second fulcrum defined by the contacting;

traversing, by a second pin comprised by one of the retainer bracket or the force bracket, a portion of a second slot defined in the other of the retainer bracket or the force bracket and laterally offset from the primary axis of the second elongate portion in a fourth direction opposite the third direction; and constraining, by the second pin, the force bracket to pivotal and linear movement relative to the retainer bracket.

12. The method of claim 11, wherein the second slot has a second length, and movement of the force bracket by the bias member in the second direction is constrained based on the second length.

13. The method of claim 11, wherein the second torque is provided throughout a predetermined range of angles that comprises the predetermined angle.

14. The method of claim 8, wherein contact between the force bracket and the gimbal and angular displacement of the elongate member beyond one or more predetermined angles urges tension of the bias member.

15. The method of claim 8, wherein at least a portion of the bias member is drawn between the force bracket and an attachment point proximal to an end of the second elongate portion distal from the pivot member.

16. A self-centering joystick controller providing compound force profiles for restoring said self-centering joystick controller to a center pivotal position after said self-centering joystick controller has been displaced therefrom, said self-centering joystick controller comprising:

a first mounting member;

a pivot member defining an axis;

an elongate member configured to pivot about the axis and comprising:

a first elongate portion configured as a first lever arm extending away from the pivot member in a first direction;

a second elongate portion extending away from the pivot member in a second direction opposite the first direction;

a retainer bracket affixed to the second elongate portion and configured to pivot relative to the first mounting member about the axis based on pivotal movement of the second elongate portion;

a gimbal moveably affixed to the first mounting member between the pivot member and the retainer bracket;

a force bracket moveably affixed to the second elongate portion by the retainer bracket and configured to pivot about the axis based on pivotal movement of the second elongate portion and pivot relative to the retainer bracket; and a bias member configured to urge movement of the force bracket in the second direction.

17. The self-centering joystick controller of claim 16, wherein the elongate member is configured to pivot about the pivot member through a predetermined angular range.

18. The self-centering joystick controller of claim 17, wherein the elongate member pivots with a first force profile between the center pivotal position and one or more predetermined angles within the predetermined angular range.

19. The self-centering joystick controller of claim 18, wherein the elongate member pivots with a second force profile, different from the first force profile, between the one or more predetermined angles and one or more outer limits of the predetermined angular range.

20. The self-centering joystick controller of claim 17, further comprising:

a first slot defined in one of the retainer bracket or the force bracket and laterally offset from a primary axis of the second elongate portion in a third direction;

a first pin comprised by the other of the retainer bracket or the force bracket and configured to extend through the first slot and travel along the first slot, such that the force bracket is substantially constrained to pivotal and linear movement relative to the retainer bracket;

a second slot defined in one of the retainer bracket or the force bracket and laterally offset from the primary axis of the second elongate portion in a fourth direction opposite the third direction; and a second pin comprised by the other of the retainer bracket or the force bracket and configured to extend through the second slot and travel along the second slot, such that the force bracket is substantially constrained to pivotal and linear movement relative to the retainer bracket.

* * * * *